United States Patent
Back et al.

(10) Patent No.: US 6,948,603 B2
(45) Date of Patent: Sep. 27, 2005

(54) HYDRAULIC TORQUE CONVERTER

(75) Inventors: Gunnar Back, Buhl (DE); Bruno Müller, Buhl (DE); Hubert Friedmann, Bühl (DE); Stephan Maienschein, Baden-Baden (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/958,320

(22) Filed: Oct. 5, 2004

(65) Prior Publication Data

US 2005/0039999 A1 Feb. 24, 2005

Related U.S. Application Data

(60) Continuation of application No. 10/617,241, filed on Jul. 9, 2003, now Pat. No. 6,814,194, which is a division of application No. 10/022,050, filed on Dec. 13, 2001, now Pat. No. 6,615,962.

(30) Foreign Application Priority Data

Dec. 14, 2000 (DE) .......................................... 100 62 499

(51) Int. Cl.⁷ .............................................. F16H 45/02
(52) U.S. Cl. ..................................... 192/3.29; 192/212
(58) Field of Search .............................. 192/3.29, 3.28, 192/3.3, 212, 55.61, 30 V

(56) References Cited

U.S. PATENT DOCUMENTS

| | | | |
|---|---|---|---|
| 1,889,698 A | | 11/1932 | Reed |
| 4,027,757 A | | 6/1977 | Radke et al. |
| 4,577,737 A | * | 3/1986 | Niikura et al. ............... 192/3.3 |
| 4,844,216 A | | 7/1989 | Fukushima |
| 4,901,596 A | | 2/1990 | Reik et al. |
| 5,860,500 A | * | 1/1999 | Olsen et al. ............... 192/3.29 |
| 6,006,878 A | | 12/1999 | Macdonald et al. |
| 6,142,272 A | | 11/2000 | Meisner et al. |
| 6,223,872 B1 | * | 5/2001 | Heller et al. ............... 192/3.29 |
| 6,615,962 B2 | | 9/2003 | Back et al. |

FOREIGN PATENT DOCUMENTS

| | | | |
|---|---|---|---|
| DE | 199 20 542 A1 | * | 11/1999 |
| DE | 199 63 236 A1 | | 7/2000 |
| FR | 2 765 939 A1 | * | 1/1999 |

OTHER PUBLICATIONS

Title: Modern Automotive Technology—Author: James E. Duffy (4 pages), Date: 94 Edition, Published by: Good-heart–Willcox, Co., Inc.

* cited by examiner

Primary Examiner—Rodney H. Bonck
(74) Attorney, Agent, or Firm—Darby & Darby

(57) ABSTRACT

A hydraulic torque converter, particularly for use in a motor vehicle between the prime mover and the transmission of the power train, employs a combination of a bypass clutch with one or more torsional vibration dampers which brings about savings in space and/or in the number of parts. In addition, the torque converter can stand long periods of use and is less prone to wear, adverse influences of abruptly developing stresses and/or other undesirable influences than conventional torque converters. Furthermore, the improved torque converter employs or can employ a bypass clutch and/or one or more torsional vibration dampers simpler and less expensive than but superior to those in conventional torque converters.

4 Claims, 8 Drawing Sheets

HYDRAULIC TORQUE CONVERTER

CROSS-REFERENCE TO RELATED CASES

This application is a continuation of application Ser. No. 10/617,241, filed Jul. 9, 2003 (now U.S. Pat. No. 6,814,194), which is a division of application Ser. No. 10/022,050 filed Dec. 13, 2001 (now U.S. Pat. No. 6,615,962), both of which are hereby incorporated by reference in their entirety.

The disclosure of the commonly owned German priority application Ser. No. 100 62 499.5, filed Dec. 14, 2000, as well as of each U.S. and foreign patent and patent application identified in the specification of the present application, is incorporated herein by reference.

BACKGROUND OF THE INVENTION

The invention relates to improvements in torque transmitting apparatus, and more particularly to improvements in hydraulic torque converters which can be utilized with advantage in the power trains of motor vehicles, e.g., between the rotary output element of the prime mover (such as an internal combustion engine) and the input element (such as a shaft) of a change-speed transmission.

A conventional hydrokinetic torque converter in the power train of a motor vehicle normally comprises a housing which shares the angular movements of the output element (such as the crankshaft) of the engine, a pump which shares the angular movements of the housing, a turbine which can receive torque from the housing by way of a body of hydraulic fluid confined in the housing and being circulated by the vanes or blades of the pump, as well as an output member (e.g., a hub) which can receive torque from the turbine to transmit torque to a driven member such as the input shaft of the change-speed transmission. The torque converter can further comprise a bypass clutch or lockup clutch (hereinafter called bypass clutch) which, when necessary or desired, transmits torque directly between the pump or housing and the turbine. Still further, such conventional torque converter can also comprise at least one torsional vibration damper which operates in the power train between the housing and the output member.

In many conventional torque converters of the above outlined character, a portion of the bypass clutch is fixedly secured to the input of the torsional vibration damper. Reference may be had, for example, to published German patent application Ser. No. 199 63 236 A1. The piston of the bypass clutch is or can be riveted to the input of the torsional vibration damper and such input comprises two annular flanges. During actuation (engagement or disengagement) of the bypass clutch, the piston of the bypass clutch is caused to move axially and to thus frictionally engage or become disengaged from the housing of the torque converter. Such axial movement of the piston entails a movement of the output of the torsional vibration damper because the output is provided with gear teeth mating with complementary gear teeth on the hub of the torque converter.

It can happen that the mating gear teeth generate pronounced friction or that they jam. In fact, the tension between the input of the torsional vibration damper and the piston of the bypass clutch, and/or non-uniform engagement of the piston of the bypass clutch with the friction surface of the housing of the torque converter, can cause the development of excessive stresses, a cracking of cooperating parts and fatigue-induced breaks. Such undesirable phenomena are particularly likely to develop in the parts which are riveted to each other. Still further, excessive tension between the piston of the bypass clutch and the input of the torsional vibration damper is likely to develop when the piston is caused to frictionally engage the housing with attendant deformation (particularly in the axial direction of the bypass clutch) when the pressure of hydraulic fluid in the cylinder chamber for the piston increases, i.e., when the piston is called upon to transmit torque from the housing to the output of the torque converter by establishing a direct power transmitting path from the output element of the prime mover, through the housing of the torque converter and to the output of the latter, i.e., by bypassing the pump and the turbine of the torque converter.

The torsional vibration damper comprises coil springs or other suitable resilient elements which act in the circumferential direction of the input and output when the input turns relative to the output and/or vice versa. When the RPM of the torsional vibration damper is very high, the springs are held against radially outward movement under the action of centrifugal force. The means for preventing such radially outward movements of the springs are costly as well as bulky because they take up room as considered axially as well as radially of the damper. In order to achieve most satisfactory friction within the entire RPM range of the springs, it is necessary to establish an optimum relationship between the parts which can or should turn relative to each other, especially between the coil springs on the one hand and the input and/or output of the torsional vibration damper on the other hand.

It is often advisable to connect the torque converter to an axially elastic disc or wall which is attached to and receives torque from the output shaft of the prime mover (such as the crankshaft of the engine) in the power plant of a motor vehicle. The connection is normally established by resorting to threaded fasteners having shanks mating with internal threads provided in one of the torque converter and the disc. This normally involves individual application and tightening of each of a plurality of threaded fasteners. Such tightening is carried out by resorting to a suitable tool which can reach the fasteners through one or more access openings provided in the housing or bell of the change-speed transmission of the power train. The torque converter must be caused to turn, at least at intervals, in order to afford access to the fasteners. Such modes of affixing the torque converter to the torsional vibration damper and of mounting the damper in the torque converter are time-consuming and necessitate the hiring of highly skilled artisans. The situation is complicated because the installation of a torque converter in the power train of a vehicle also invariably necessitates the hiring of highly skilled artisans who are capable of carrying out the above outlined undertakings in addition to centering of cooperating moving (rotary) parts relative to the adjacent part or parts.

OBJECTS OF THE INVENTION

An object of the instant invention is to provide a hydraulic torque converter which is more reliable than heretofore known torque converters and whose useful life is much longer than those of the aforediscussed and other conventional apparatus of such character.

Another object of the invention is to provide a torque converter which can be assembled and installed in the power train of a motor vehicle or the like in a manner much simpler than conventional torque converters.

A further object of the present invention is to provide a torque converter which is constructed and assembled with a view to reduce the effects of fatigue upon its useful life and/or upon the reliability of its operation and which is more likely to withstand the effects of unanticipated stresses, hard-to-detect cracks and/or breaks as well as weakening of joints, connections and wear-induced problems than conventional torque converters.

An additional object of this invention is to provide a novel and improved method of assembling a torque converter and of installing such apparatus-in partly or fully assembled condition—in the power train of a motor vehicle.

Still another object of the invention is to provide one or more novel and improved torsional vibration dampers for use in the aforediscussed novel hydraulic torque converter.

A further object of the invention is to provide a novel and improved combination of a bypass clutch and one or more torsional vibration dampers for use in a hydraulic torque converter.

Another object of this invention is to provide a torque converter which embodies a bypass clutch and wherein the generation and/or application or utilization of friction and/or damping can be initiated and controlled in a manner more reliable and more predictable than in conventional torque converters.

An additional object of the invention is to provide a torque converter whose operation is more reliable and more predictable within the entire RPM range of the rotary output element or elements of the prime mover, such as the camshaft or the crankshaft of the internal combustion engine in the power train of a motor vehicle, than the operation of conventional torque converters.

Still another object of the invention is to provide a novel and improved method of operatively connecting the improved torque converter with a shaft, disc or another rotary output element of a prime mover.

A further object of our invention is to provide a torque converter wherein one or more rotary and/or otherwise movable parts of the bypass clutch, of one or more torsional vibration dampers and/or one or more other components can be centered in a manner simpler, more reliable and less time-consuming than that required for analogous manipulation(s) of components in conventional torque converters.

Another object of the invention is to simplify the assembly of the torque converter with a prime mover and/or with a driven unit (such as a variable-speed transmission) in the power train of a motor vehicle.

An additional object of the invention is to provide a torque converter which is constructed and assembled in such a way that its space requirements in a motor vehicle (such as between the engine and the transmission) are much less than in heretofore known power trains.

Still another object of the invention is to provide a power train which can be utilized in any one of a large number of different power trains to meet one or more specific or broad requirements pertaining to savings in space, material and/or number of parts, to reliability and/or useful life, to the possibility to occupy space which is avaiable under the hood of or elsewhere in a motor vehicle and/or to meet two or more of the above-enumerated and/or other prerequisites.

A further object of the instant invention is to provide a power train, particularly for use in a motor vehicle, which embodies a torque converter exhibiting at least some of the above-enumerated features and attributes.

SUMMARY OF THE INVENTION

One feature of the present invention resides in the provision of a hydraulic torque converter which comprises a housing arranged to rotate about a predetermined axis, to confine a supply of a suitable hydraulic fluid and to receive torque from an output element of a prime mover (e.g., from the crankshaft of an internal combustion engine in the power train of a motor vehicle). The improved torque converter further comprises a pump which is disposed in and is arranged to rotate with the housing about the predetermined axis, and an annular turbine which is coaxial with the pump, which is disposed in the housing and which is arranged to receive torque from the fluid in the housing in response to rotation of the pump. The improved torque converter also comprises a rotary input element (e.g., the input shaft of a change-speed transmission) which is coaxial with the housing, a rotary output member (such as a hub) which is arranged to transmit torque between the input element and at least one of the pump, turbine and housing, a bypass clutch which is engageable to transmit force between the pump and the turbine during predetermined stages of operation of the torque converter, and at least one torsional vibration damper in a power flow between the housing and the output member. The damper comprises an input, an output which is coaxial with the housing and with the input and is rotatable relative to the input, and energy storing means arranged to oppose rotation of the input and the output relative to each other.

The improved torque converter can further comprise a stator which, if used, is installed between the pump and the turbine.

The input element can include or constitute or form part of a shaft of an automatic change-speed transmission.

The bypass clutch can include a substantially disc-shaped member and the torque converter can further comprise means for resiliently connecting the disc-shaped member to the input of the damper with freedom of movement in the direction of the axis of the housing. The substantially disc-shaped member can include or constitute a piston of the bypass clutch, and such torque converter can further comprise a force-locking connection between the piston and the housing; such connection can include friction surfaces which contact each other in the engaged condition of the bypass clutch.

The aforementioned member (piston) of the bypass clutch can be connected with the input or with the output of the damper at a plurality of points which are spaced apart from each other in the circumferential direction of the turbine. The input or the output of the damper and/or the member (piston) of the bypass clutch can be provided with stiffness reducing means disposed at least partially radially inwardly of the aforementioned array of connection points, namely with means for reducing the stiffness of the input, output or piston in the direction of the predetermined axis.

The stiffness reducing means can include an annular array of recesses in the input, output or piston, and each such recess can be adjacent one of the aforementioned plurality of points. For example, each recess can include an arcuate slit which partially surrounds one of the points. The width of one end portion of each slit can exceed the width of the other end portion and/or the width of an intermediate portion of the respective slit. One end portion of each recess or slit in the input, output or piston can extend radially outwardly beyond at least one of the aforementioned points.

If the recesses are slits provided in the input of the torsional vibration damper, such slits can be provided in the radially outermost portion of the input and can have open ends at the periphery of the input.

An enlarged end of each slit can be spaced apart from the axis of the housing the same distance as the aforementioned points.

The slits, recesses or other suitable stiffness reducing means can be provided in the input or output of the damper and/or in the piston of the bypass clutch during a first stage of assembly of the damper with the housing and the output member, and the input can undergo a shaping treatment (such as the imparting of the final shape) during a second stage which follows the first stage of assembly of the damper with the housing and with the output member.

The damper can be installed in a power flow between the bypass clutch and the output member or in a power flow between the turbine and the output member.

The input of the damper can include at least two walls or panels, and such torque converter can further comprise means (such as rivets) for connecting at least one wall of the input with a member (such as a piston) of the bypass clutch.

A portion of the bypass clutch can be placed next to a portion of the torsional vibration damper, and such torque converter can further comprise an annular array of fasteners (such as rivets) which spacedly surround the axis of the housing and connect the two portions to each other. Such torque converter can further comprise means (such as the aforementioned slots) for reducing the stiffness of at least one of the interconnected portions in the axial direction of the housing. The slots, recesses or analogous stiffness reducing means are or can be adjacent the fasteners. Each such recess or slot can be open as seen radially outwardly away from the axis of the housing and closed radially inwardly of neighboring fasteners. The recesses can alternate with the fasteners, and the widths of at least some of the recesses—as seen in the circumferential direction of the portions of the damper and bypass clutch—can increase in a direction toward the axis of the housing.

It is also possible to provide the input or the output of the damper and/or the piston of the bypass clutch with recesses having closed radially inner end portions nearest to the axis of the housing and bounded by at least substantially circular surfaces of the input, output and/or piston; each such recess can resemble a keyhole.

The widths of at least some of the recesses—as seen in the circumferential direction of the housing—can decrease in a direction toward the axis of the housing. For example, such recesses can be bounded by an undulate peripheral surface of the input, output and/or piston.

A portion (such as the aforementioned piston) of the bypass clutch can be connected to a portion (such as the input) of the damper by suitable springs with limited freedom of movement in the direction of the axis of the housing of the improved torque converter. The springs can include an annuar array of leaf springs which spacedly surround the axis of the housing. Such torque converter can further comprise means for non-rotatably connecting the input of the damper with the turbine. The piston of the bypass clutch and the housing include annular portions which frictionally engage each other in the engaged condition of the bypass clutch, and the aforementioned leaf springs can connect the input of the damper with a radially outermost part of the aforementioned portion (piston) of the bypass clutch.

The energy storing means of the at least one damper can include an annulus of coil springs and means for limiting the movability of such springs at least radially of the axis of the housing. The means for limiting can include a ring which is surrounded by the convolutions of the coil springs with limited freedom of movement of the springs and ring relative to each other radially of the axis of the housing. Such torque converter can further comprise means for connecting the ring to the damper, namely to the input or the output of the damper. The ring can be made of any suitable material, especially a metallic or a plastic material.

The means for limiting can include a preshaped annular member and the convolutions of the coil springs forming part of the damper spacedly surround the preshaped annular member. The end portions of the latter can be affixed to each other by bonding (such as welding), by hooking (i.e., by resorting to one or more hooks at one end of the annular member and to one or more eyelets for such hook or hooks at the other end of the annular member) or by nesting (e.g., by fitting a male member at one end into a complementary female member at the other end of the annular member).

The input and/or the output of the damper can include means for locating the annular member relative to the input and the output in at least one of the directions including radially of the axis of the housing and in the direction of such axis. The locating means can include an annular array of discrete projections provided on the input and/or on the output of the damper. The projections can further serve as a means for tensioning the annular member. Each such projection can include a deformed portion of the input and/or the output of the damper.

The ratio of the diameter $d$ of the wire of the ring to the inner diameters D of convolutions of the coil springs is or can be determined by the relationship $0.8*D>d>0.2*D$, preferably by the relationship $0.6*D>d>0.3*D$.

The springs of the energy storing means can be received in recesses provided therefor in the input of the damper, and such input can be further provided with at least substantially radial arms alternating with the recesses, as seen in the circumferential direction of the damper. The output of such damper can include entraining portions which cooperate with the arms to stress the springs in response to rotation of the input relative to the output and/or vice versa.

The arms and/or the entraining means can be provided with surfaces which at least substantially conform to the surfaces of adjacent portions of the springs forming part of the energy storing means.

One or more springs of the energy storing means can be installed in prestressed condition, i.e., such springs are caused by the adjacent arms to store energy even in neutral angular positions of the input and output of the damper relative to each other. Alternatively or in addition to the just mentioned feature, the springs can be maintained in prestressed condition by the entraining portion of the output of the damper. The recesses of the input of the damper can be bounded by surfaces making right angles with each other.

Another feature of the present invention resides in the provision of a hydraulic torque converter which comprises a housing including a mass and being arranged to rotate about a predetermined axis, to confine a supply of hydraulic fluid and to receive torque from an output element of a prime mover. The improved torque converter further comprises a pump which is disposed in and is arranged to rotate with the housing about the latter's axis, an annular turbine which is coaxial with the pump, which is disposed in the housing and which is arranged to receive torque from the fluid in the housing in response to rotation of the pump, a rotary input element which is coaxial with the housing, a rotary output member which is arranged to transmit torque between the input element and the pump, housing and/or turbine, and a bypass clutch which is engageable to transmit force between the pump and the turbine during predetermined stages of operation of the torque converter. The latter further comprises at least one torsional vibration damper including an input, an output coaxial with the housing and with the input and rotatable relative to the input, energy storing means arranged to oppose rotation of the input and output relative to each other, and a torque transmitting member between the output element and the input. Still further, the torque converter comprises an annular array of retaining members provided on the mass and received in openings provided therefor in the torque transmitting member, and means for holding the retaining members in the respective openings.

The retaining members can include pins having axes at least substantially parallel to the axis of the housing and including end portions which extend or can extend through and beyond the respective openings; the holding means can engage such end portions of the pins. Such holding means can extend at least substantially circumferentially of the torque transmitting member.

In accordance with one presently preferred embodiment, the holding means includes a ring-shaped support and discrete holding members provided on the ring-shaped support and each engaging one of the retaining members.

The torque transmitting member can be disposed between the prime mover and the mass of the housing, as seen in the axial direction of the housing.

At least one of the retaining members can have an at least substantially conical shape and the corresponding opening has a complementary shape to snugly receive the conical retaining member.

The openings are or can be provided in a reinforced portion of the torque transmitting member; the latter can include a substantially disc-shaped body having a folded over radially outermost part which constitutes the reinforced portion of the torque transmitting member.

The mass of the housing can constitute an annular body, and the holding means can include forks each of which has prongs extending at least substantially circumferentially of the annular mass and engaging free end portions of the respective retaining members. The prongs can be received in grooves provided therefor in the free end portions of the respective retaining members. It is advisable to ensure that the forks are maintained in frictional engagement with the torque transmitting member and with the respective retaining members.

As already mentioned hereinbefore, the holding means can include a discrete holding member for each of the retaining members and a ring-shaped support for the holding members. Such torque converter can further comprise means for securing the ring-shaped support to the torque transmitting member against accidental separation from the latter.

The retaining members can include or constitute forks which extend circumferentially of the ring-shaped support. Each fork engages one of the retaining members and is separable from the respective retaining member in response to rotation of the ring-shaped support relative to the mass and/or vice versa. The forks cooperate with the retaining members to hold the ring-shaped support against movement relative to the mass in the axial direction of the housing.

The torque converter can further comprise means for preventing undesired rotation of the ring-shaped support relative to the mass when the retaining members are held in the respective openings. The rotation preventing means can comprise at least one snap fastener; such snap fastener can include a detent which is provided on the holder or on the torque transmitting member of the damper and an opening for the detent in the torque transmitting member or in the holder.

The novel features which are considered as characteristic of the invention are set forth in particular in the appended claims. The improved torque converter itself, however, both as to its construction and the modes of assembling, installing and utilizing the same, together with numerous additional important and advantageous features and attributes thereof, will be best understood upon perusal of the following detailed description of certain presently preferred specific embodiments with reference to the acccompanying drawings.

DESCRIPTION OF PREFERRED EMBODIMENTS

Figure 1:
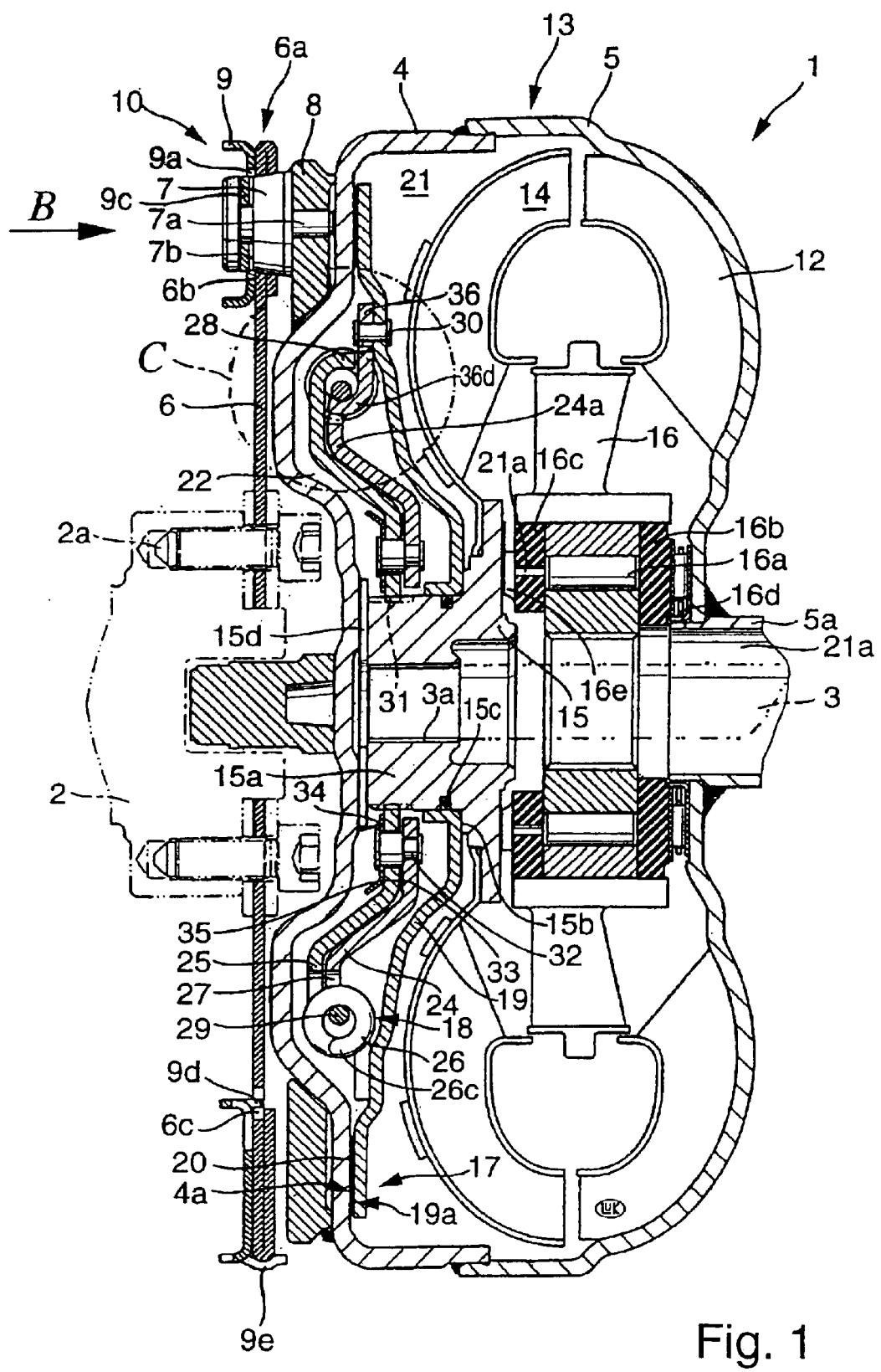
FIG. 1 is an axial sectional view of a hydraulic torque converter which embodies one form of the present invention and is installed between the rotary output shaft of an engine and the input element of a change-speed transmission in the power train of a motor vehicle.

The hydraulic torque converter 1 which is shown in FIG. 1 comprises a housing 13 which is affixed to the output element 2 of a prime mover, not shown. The output element 2 can constitute the crankshaft of an internal combustion engine in the power train of a motor vehicle; such power train further includes a rotary input element 3 of a change-speed transmission (not shown) which can drive the wheels or certain wheels of the motor vehicle by way of a differential in a manner well known in the art. The torque converter 1 is a fluid-operated clutch which can be utilized in lieu of a dry friction clutch to uncouple the engine in order to stop the motor vehicle in gear or to couple the engine for acceleration. Reference may be had, for example, to pages 691–693 of "Modern Automotive Technology" by James E. Duffy (1994 Edition published by The Goodheart-Willcox Company, Inc., Tinley Park, Ill.). As concerns the operation of a power train which employs a friction clutch, in lieu of a torque converter, reference may be had, for example, to commonly owned U.S. Pat. No. 4,901,596 granted Feb. 20, 1990 to Reik et al. for "ASSEMBLY FOR TAKING UP AND COMPENSATING FOR TORQUE-INDUCED SHOCKS".

The input element 3 preferably constitutes the input shaft of an automatic or automated change-speed transmission. The housing 13 comprises coaxial shells 4 and 5 which are sealingly secured (such as welded) to each other. It is also possible to connect the shells 4, 5 to each other by resorting to threaded fasteners, to caulking, to a bayonet lock, to a snap-in connection or the like. It is advisable to employ one or more washers and/or other metallic, plastic or other elastic sealing elements and/or to resort to a press fit in order to ensure adequate sealing of the interior of the housing 13 from the surrounding atmosphere.

The means for non-rotatably securing the shell 4 of the housing 13 to the output shaft 2 of the prime mover comprises an axially yieldable elastic torque-transmitting disc 6 having a radially inner portion affixed to the shaft 2 by an annular array of threaded fasteners 2a (two can be seen in FIG. 1). These fasteners further serve as a means for ensuring that the axis X—X of the housing 13 coincides with the axis of the output shaft 2 as well as with the common axis of rotary components of the torque converter 1.

The annular radially outermost portion 6a of the torque transmitting disc 6 is reinforced in that it is folded over itself, e.g., in a suitable cold forming machine. This outermost portion 6a is affixed to a ring-shaped portion or flywheel or mass 8 of the housing 13 in a novel manner, namely by a fastener assembly 10. The latter comprises an annular array of preferably equidistant conical retaining members or projections 7 in the form of short pins borne by the mass 8 and snugly received in complementary conical openings 6b provided in the reinforced portion 6a of the disc 6. The axes of the projections or pins 7 are parallel to the axis X—X of the housing 13, and these pins extend in a direction from the shell 4 of the housing 13 toward the engine including the output shaft 2. The mass 8 is centered on and is welded or otherwise affixed to the shell 4; this mass is a circumferentially complete body but it can be replaced with a set of discrete segments each of which can carry one or more abutments or pins 7.

The radially outermost portion of the shell 4 is recessed in a direction axially of and away from the disc 6 in order to provide room for the mass 8, i.e., to thus contribute to a reduction of axial length of the housing 13 and hence of the entire torque converter 1. The arrangement can be such that the left-hand side of the mass 8 need not even extend to the plane of the leftmost portion of the shell 4. The illustrated mass 8 is at least substantially coplanar with and spacedly surrounds the heads of the threaded fasteners 2a. This is made possible because the central portion of the shell 4 is also recessed in a direction away from the torque transmitting member or disc 6.

Each projection 7 has a stud-shaped extension 7a which is recessed into the mass 8; for example, each stud 7a can be provided with an external thread mating with a complementary internal thread in the respective tapped bore or hole of the mass 8. Alternatively, and if the projections 7 are to serve solely as a means for centering (or as a means for assisting the centering) of the mass 8 on the disc 6, these projections can be welded or otherwise more or less permanently affixed to the mass.

The means for holding the torque converter against axial movement relative to the disc 6 includes a ring-shaped support here shown as a bayonet lock 9 having openings 9a for entry of tips (free end portions) of the projections 7 in one (non-locking) angular position of the bayonet lock. The latter is thereupon turned so that its fork-shaped or stud-shaped holding members 9c enter complementary openings 7b of the projections 7. Blocking devices 9d in the form of snap fasteners on the bayonet lock 9 then enter complementary openings 6c by snap action. In order to prevent accidental separation of the bayonet lock 9 from the disc 6, the peripheral portion of the member 9 is provided with an annular array of axially extending resilient tongues 9c which engage adjacent portions of the peripheral surface of the disc 6.

It is within the purview of the present invention to employ a starter gear (not shown) which is affixed to the disc 6 or to the mass 8, or which forms part of the member 6 or 8. Furthermore, the mass 8 and/or the disc 6 can be provided with a customary arrangement of indicia (e.g., in the form of notches) which can be monitored by means serving to control the operation of the combustion engine including the shaft 2. Alternatively, such indicia can be provided on a discrete part (not shown) which is affixed to the disc 6 or to the mass 8.

Figure 4:
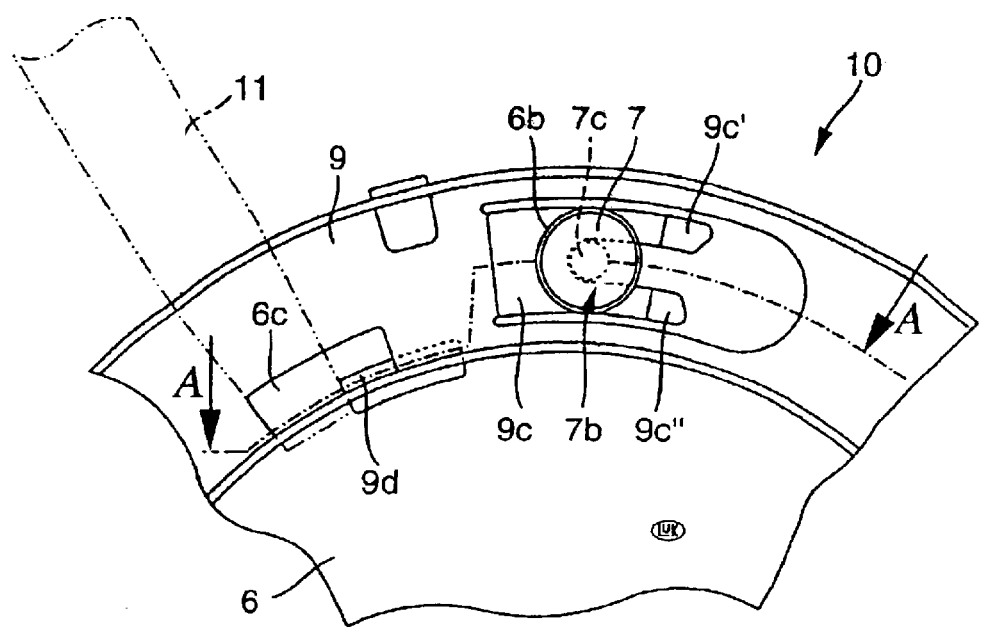
FIG. 4 is a fragmentary elevational view of the input in a modified torsional vibration damper and of an assembly which connects the input to a disc borne by the output shaft of the engine.
Figure 5:
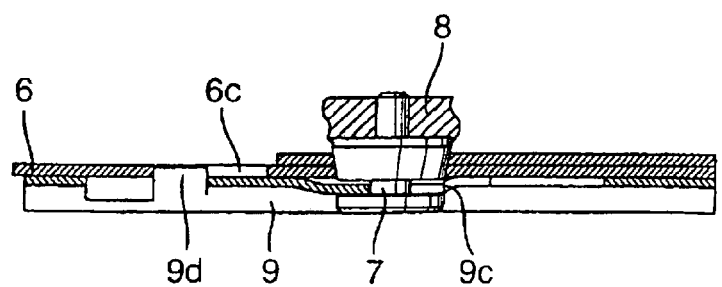
FIG. 5 is a sectional view substantially as seen in the direction of arrows from the arcuate phantom line V—V in FIG. 4.

The fastener assembly 10 is shown in greater detail in FIGS. 4 and 5. As already mentioned hereinbefore, this assembly serves to separably connect the torque transmitting disc 6 with the torque converter 1. FIG. 4 is a fragmentary front elevational view of the fastening assembly 10 as seen in the direction of the arrow IV in FIG. 1, and FIG. 5 is a sectional view as seen in the direction of arrows from the arcuate line V—V shown in FIG. 4. As can be seen in FIG. 4, the bayonet lock 9 is affixed to the axially elastic torque transmitting disc 6 (e.g., a body made of a suitable metallic sheet material). The tensioning or holding forks 9c (only one shown in each of FIGS. 4 and 5) extend circumferentially of the bayonet lock 9; for example, this bayonet lock can be provided with at least three forks 9c with pairs of prongs 9c', 9c" bent out of the plane of the major part or body of the bayonet lock so that the prongs are spaced apart from and parallel to one side of the major part. The prongs 9c', 9c" flank the tip 7c of the respective projection 7 and extend into the respective opening 7b.

FIG. 4 shows one of the forks 9c of the bayonet lock 9 in full engagement with the tip 7c of the respective projection 7, i.e., the tip 7c prevents any further angular movement of the bayonet lock relative to the torque transmitting disc 6. The projection 7 is urged into the respective complementary opening 6b of the disc 6 so that the peripheral surface of this projection is in frictional engagement with the surface bounding the opening. A detent including a snap fastener tongue 9d extends into the opening 6c of the disc 6 so that the parts 6 and 8 are releasably locked against angular movement relative to each other. It will be noted that proper assembly of the disc 6 with the housing 13 merely necessitates a slight turning of the parts 6, 8 relative to each other as soon as the projections 7 are received in the complementary openings 6b; this is much simpler and less time-consuming than the conventional procedures which normally involve the utilization of a set of screws or bolts and nuts which are individually applied to secure the disc 6 or an equivalent thereof to the housing of the torque converter.

The mode of utilizing the fastening assembly 10 is as follows: The torque converter 1 is assumed to be properly assembled with the change-speed transmission including the input shaft 3. In order to mount the transmission on the output shaft 2 of the engine, the projections 7 are inserted into their respective complementary openings 6b. An auxiliary tool 11 (shown in FIG. 4 by phantom lines and preferably constituting a suitably configurated piece of metallic sheet material) is employed to thereupon turn the bayonet lock 9 relative to the disc 6 until the extension 9d terminates such turning in that it enters the opening 6c. A similar tool can be employed to initiate a disengagement of the disc 6 from the projections 7 of the mass 8 and housing 13; such tool is utilized to lift the snap fastener 9d out of the opening 6c and to thus release the housing 13 for angular movement relative to the disc 6, i.e., the bayonet lock 9 is disengaged from the tips of the projections 7.

An advantage of the just described undertakings involving a connection of the housing 13 (i.e., of the torque converter 1) to the disc 6 (i.e., to the output shaft 2) and a disengagement of the housing from the disc is that such procedures can be carried out without necessitating the provision of any additional space in the direction of the axis X—X. Another advantage of such mounting of the housing 13 on the disc 6 and shaft 2 is that rotation of the bayonet lock 9 relative to the reinforced radially outermost portion 6a of disc 6 results in simultaneous locking of all projections 7 in the respective openings 6b of the disc without necessitating any repeated turning of the shaft 2. This is in contrast with conventional procedures which involve the utilization of several screws, bolts and nuts or like threaded fasteners. Thus, in order to remove all of the threaded fasteners, it is necessary to repeatedly index a conventional torque converter in order to move successive threaded fasteners to a position in which they can be reached by a wrench or another suitable tool.

A single turning of the bayonet lock 9 relative to the disc 6 and housing 13 releases all of the fasteners 7 for withdrawal from the respective openings 6b of the disc 6, or such single turning effects a retention of all fasteners in their respective openings; this feature alone contributes to substantial savings in time during mounting of the torque converter 1 on or during its separation from the disc 6 and shaft 2. Though it is possible to remove all of the threaded fasteners of a conventional connection between the torque converter and the output shaft of an engine without repeatedly turning the shaft and/or the housing of the torque converter, this is possible only if the fully installed conventionally mounted torque converter provides access to several nuts or screws without any changes in its angular position; this can be achieved only by resorting to a pronounced increase of the combined axial length of the engine and the torque converter.

The bayonet lock 9 can be made of a metallic or plastic sheet material, e.g., of a plastic material which is reinforced with carbon filaments and/or with other suitable reinforcing or stabilizing materials.

As can be seen in FIG. 5, the forks 9c (only one shown) of the bayonet lock 9 can also serve to accurately center the housing 13 of the torque converter 1 (such housing is rigid with the fasteners 7 and the mass 8) on the disc 6 in that the prongs 9c', 9c" (see FIG. 4) of the forks can engage the neck of the respective fastener without any play when the detent 9d snaps into the adjacent recess 6c of the disc 6. As also shown in FIG. 5, the extension 7a of the fastener 7 shown therein is received in the mass 8 without play. The bayonet lock 9 cooperates with the fastener 7 to properly center the mass 8 relative to the disc 6.

It is clear that the fastener assembly 10 or an equivalent thereof can be utilized with advantage in many conventional power trains to non-rotatably but releasably secure two or more parts to each other. For example, such assembly can be utilized in many conventional power trains to secure a torque converter or a friction clutch to the output element of an engine or another prime mover; such conventional power train need not embody any other features of the torque converter which is disclosed in the present application. Furthermore, the improved fastener assembly 10 can be utilized to mount and center a friction clutch on the input shaft of a change-speed transmission in a power train wherein the clutch is employed in lieu of a torque converter. Still further, the disc 6 can be replaced with a rigid disc which does not permit any or any appreciable axial movements of the housing 13 relative to the output shaft 2. The illustrated axially yieldable resilient disc 6 is preferred in many instances because it is capable of damping at least some stray movements of the shaft 2 and housing 13 relative to each other in the direction of the axis X—X as well as at least some wobbling movements relative to such axis.

The torque converter 1 further comprises a pump or impeller 12 which is coaxial with and shares the angular movements of the shell 5, a turbine 14 which is disposed in and is rotatable with as well as relative to the housing 13, and preferably also a stator 16 which is installed between the pump 12 and the turbine 14 (as seen in the direction of the axis X—X). The turbine 14 is rotated by the body of oil or other suitable hydraulic fluid in the housing 13 when the latter rotates with the pump 12 in response to rotation of the output shaft 2. The turbine 14 is non-rotatably connected with a rotary output member 15 (hereinafter also called hub) which is non-rotatably connected to the input element 3 by an internal gear 3a.

The stator 16 can influence the transmitted torque and is mounted on a freewheel 16a which surrounds the input shaft 3 of the transmission. An important function of the stator 16 is to improve the circulation of fluid in the housing 13. FIG. 1 shows that the stator 16 is flanked by two distancing members 16b, 16c; the member 16b is mounted on a suitable bearing 16d (e.g., a friction bearing which is adjacent and can rotate relative to the radially innermost portion of the shell 5), and the member 16c is adjacent an annular arrangement of lobes 16e at the right-hand axial end of the hub 15. This hub has an axial extension 15a separated from the radially innermost portion of the shell 4 by a friction bearing 15d.

The torque converter 1 further comprises a bypass clutch 17 which can be engaged to transmit torque directly between the shell 4 of the housing 13 (i.e., directly from the output shaft 2) and the hub or output member 15. To this end, the bypass clutch 17 employs a member 19 which acts as a piston in that it can be moved axially of the housing 13 in order to place its annular friction surface 19a into or away from engagement with the confronting annular friction surface 4a of the shell 4. A friction lining 20 can be affixed to the radially outermost portion of the piston 19 or to the shell 4 to define the friction surface 19a or 4a and to constitute or establish a force-locking connection between the piston 19 and the housing 13.

A torsional vibration damper 18 is installed in the power flow between the housing 13 and the hub 15 downstream of the bypass clutch 17. The piston 19 of the clutch 17 is movable axially of the housing 13 along the axial extension 15a of the hub 15 into and away from abutment with a radially extending axial stop 15b.

The friction lining 20 is optional; it can be utilized in order to enhance the friction coefficient of the bypass clutch 17 and can be glued, riveted or otherwise affixed to the piston 19 or to the shell 4 of the housing 13. It is also possible to employ two friction linings, one on the piston and the other on the shell 4. That side or surface of the friction lining 20 which constitutes the friction surface 4a or 19a can be profiled (such as ribbed) to promote the cooling of the bypass clutch 17 in actual use. The profiling can be such that it allows for a controlled flow of coolant between two chambers 21 and 22; such coolant is or can be the hydraulic fluid which causes the turbine 14 to rotate in response to rotation of the pump 12 during certain stages of operation of the torque converter 1. Cooling of the bypass clutch 17 is particularly important when the clutch operates with slip, i.e., when the surfaces 4a, 19a bear against and slide relative to each other. The arrangement is preferably such that the chambers 21, 22 are at least substantially sealed from each other when the clutch 17 is fully engaged, i.e., when the piston 19 is driven by and at the speed of the shell 4; at such time, the only flow of fluid between the chambers 21, 22 is that permitted by the profiling of the friction surface 4a and/or 19a.

The collar constituting the radially innermost portion of the piston 19 is sealed against the peripheral surface of axial extension 15a of the hub 15 by an annular sealing element 15c, e.g., a split ring or the like.

In order to engage the bypass clutch 17, the chamber 21 receives hydraulic fluid from a suitable pump or another fluid source (not shown) through a channel 21a provided in the input shaft 3 of the change-speed transmission and in the non-illustrated transmission case within the tubular neck 5a (radially innermost portion) of the shell 5; such neck 5a is in sealing engagement with the transmission case in a manner not shown in FIG. 1 because it forms no part of the present invention. The shell 5 receives the pump or impeller 12 and at least a portion of the non-rotatable stator 16. The distancing member 16c is provided with one or more axially parallel openings 21b in the form of bores which can convey pressurized fluid in order to establish a pressure differential between the interiors of the chambers 21 and 22; such pressure differential causes the piston 19 to move axially into selected or desired or required frictional engagement with the shell 4 (i.e., with the housing 13). The frictional engagement entails an operation of the bypass clutch 17 without slip or with a required slip.

The pressure of fluid in the chamber 22 is caused to increase when the bypass clutch 17 is to be disengaged or to operate with a reduced slip. This is achieved by causing the chamber 22 to receive pressurized fluid along a path defined, for example, in part by a channel or bore in the input shaft 3 and at least one channel or bore in the profiled friction bearing 15d between the radially innermost portion of the shell 4 and the axial extension 15a of the hub 15. The pressure of fluid in the just mentioned path is established by a pump (not shown) or another suitable source of pressurized fluid and must suffice to ensure that the pressure in the chamber 22 rises above that in the chamber 21 so that the piston 19 is shifted axially toward the turbine 14, i.e., that the friction surface 19 is at least partially disengaged from the friction surface 4a.

The piston 19 of the bypass clutch 17 can be permanently biased in one of the two axial directions (toward or away from the turbine 14); this ensures that, when the pressure of fluid in the chamber 21 or 22 matches or closely approximates that of fluid in the chamber 22 or 21, the clutch 17 is automatically engaged or fully disengaged, depending upon the direction of uninterrupted axial stressing of the piston 19.

The torsional vibration damper 18 is installed in the power flow between the output shaft 2 and the hub 15 (by way of the fastener assembly 10 and housing 13) and is active in the engaged condition of the bypass clutch 17. The damper 18 comprises an input 24 which is connected with the piston 19 of the bypass clutch 17, an output 25 which is connected with the hub 15 (in some instances with a certain freedom of angular movement), and energy storing means including (in the embodiment of FIGS. 1 to 5) an annular array of eight equidistant coil springs 26 serving to oppose angular movements of the input 24 and output 25 relative to each other. The number of coil springs 26 (or of other suitable energy storing elements) can be reduced to one, two, three and so on, or increased to nine or more.

Each spring 26 is received in a radial recess or window 27 (see FIG. 2) at the periphery of the input 24, and each such recess is flanked by two radially outwardly extending arms 36 of the input. The springs 26 can be prestressed, i.e., the arms 36 can cause these springs to store energy even when the input 24 and the output 25 are permitted or caused to assume neutral positions in which the output does not influence the stressing of such springs. The output 25 has entraining portions 28 which can engage the end convolutions 26a of the adjacent coil springs 26 to cause the springs to store additional energy in response to angular movement of at least one of the input 24 and output 25 from its starting or neutral position in which the springs 26 are or can be only prestressed, namely caused to store only that energy which is imparted thereto by the respective pairs of arms 36.

The entraining portions 28 are disposed at the periphery of the output 25 and are obtained by removing material from the output at a radial distance from the axis X—X corresponding to that between the axis and the recesses 27 of the input 24. In order to increase the areas of contact between the entraining portions 28 and the adjacent end convolutions 26a of the respective coil springs 26, such entraining portions can be bent in a manner best shown at 28a in the upper half of FIG. 1 and in FIG. 3, i.e., the radii of curvature of the bent ends 28a can match or approximate the radii of the convolutions 26a. The same applies for the radially outermost portions of the arms 36 of the input 24, i.e., such radially outermost portions can be bent in the same way as the parts 28a so as to establish a larger-area contact with the adjacent end convolutions of the respective coil springs 26.

Figure 2:
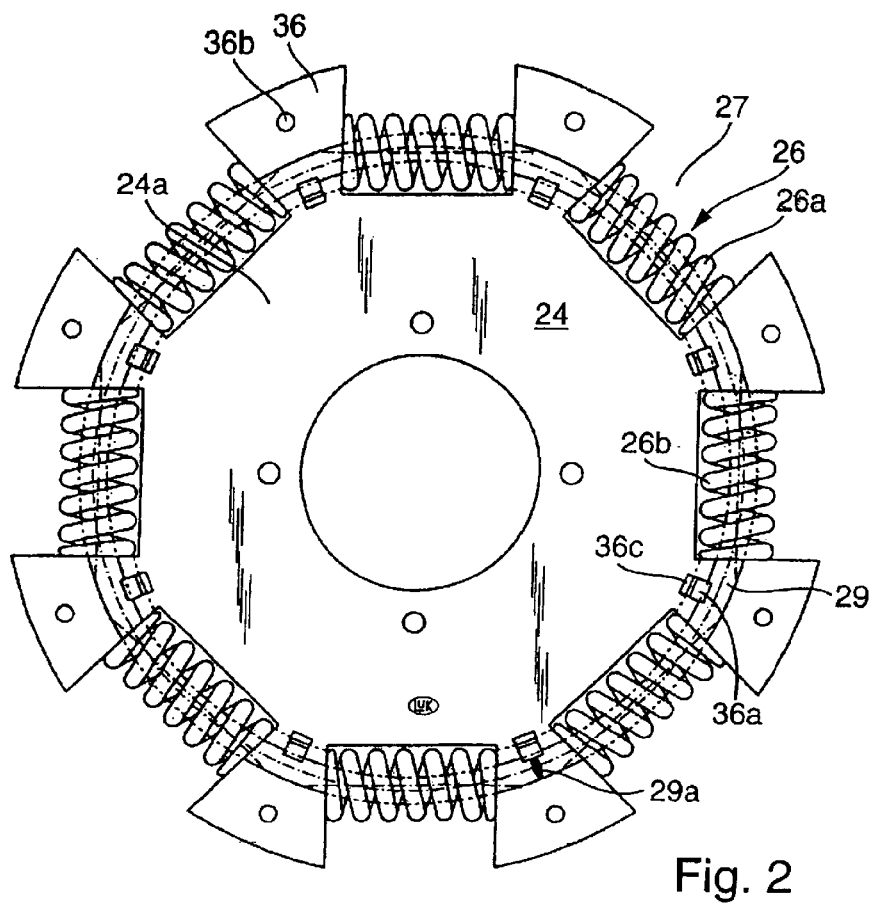
FIG. 2 is an elevational view of the input and of the energy storing means of the torsional vibration damper in the torque converter as seen from the left-hand side of FIG. 1.

In order to hold the coil springs 26 against excessive movements radially outwardly under the action of centrifugal force while the input 24 and the output 25 rotate about the axis X—X, the damper 18 preferably includes at least one wire ring 29 which is surrounded by the convolutions 26a of all eight coil springs 26 (see FIG. 2). The position of the ring 29 is determined by locating projections 36a (see FIGS. 2 and 3) which constitute suitably bent portions of the input 24 and engage the ring 29 from within to thus select and determine the extent to which the coil springs 26 can move radially outwardly under the action of centrifugal force when the input 24 rotates. Thus, once the torque converter 1 is assembled and installed between the shafts 2 and 3, the position of the ring 29 is fixed by the locating projections 36a of the input 24. It is preferred, that the locating projections 36a further serve to fix the position of the ring 29 in the axial direction of the housing 3.

Figure 3:
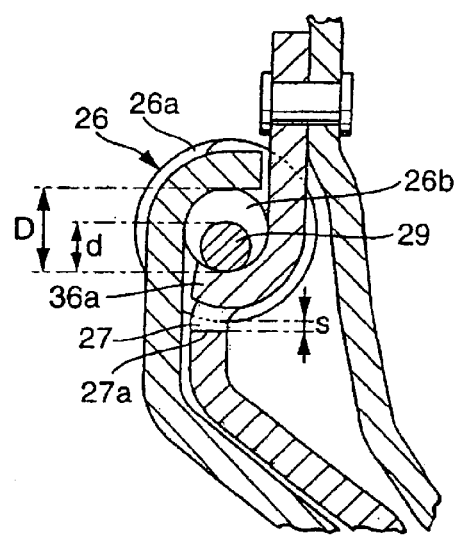
FIG. 3 is an enlarged view of a detail within the phantom-line circle III shown in FIG. 1.

FIG. 3 shows that the inner diameters D of the convolutions 26a (i.e., the diameter of the compartment or space 26b surrounded by the convolutions 26a of a coil spring 26) can equal or approximate $2\underline{d}$ wherein $\underline{d}$ is the diameter of the wire of which the ring 29 is made. It is presently preferred to employ a wire having a diameter $\underline{d}$ which is slightly greater than one half of the inner diameter of a convolution 26a. The ends of this wire can be welded (at 29a) to each other. Alternatively, one of these ends can be provided with a hook (not shown) and the other end can be provided with an eyelet for the hook; such solution is preferred if it is anticipated that the ring 29 will necessitate replacement or temporary removal during the useful life of the torque converter 1. The wire of the ring 29 can be bent to resemble its utimate shape (shown in FIG. 2) prior to causing it to pass through the internal spaces 26b of the coil springs 26.

The locating projections 36a of the input 24 can be provided with slits 36c (shown in each of FIGS. 2 and 3) which reduce the stiffness of the arms 36 as seen in the axial direction of the input 24. The ratio of $\underline{d}$ to D is or can be determined by the relationship or equation $0.8*D>\underline{d}>0.2*D$, preferably $0.6*D>\underline{d}>0.3*D$. The arrangement can be such that the wire of the ring 29 contacts the convolutions 26a of the coil springs 26 at its radially innermost as well as at its radially outermost portions. In all instances $D>\underline{d}$ and preferably $D>\underline{d}>0.25$ D, most preferably $0.66D>\underline{d}>0.25D$. As concerns the diameter of the ring 29, it is preferably selected in such a way that this ring contacts the radially innermost portions of the convolutions 26a of all coil springs 26 when the ends of the wire of the ring 29 are secured to each other at 29a. In other words, and as shown in FIGS. 2 and 3 the ring 29 can be dimensioned to ensure that the springs 26 have a minimal radial clearance or play $\underline{s}$ (see FIG. 3) relative to the surfaces 27a surrounding the radially outermost portions of the recesses 27. Such dimensioning of the ring 29 reduces the likelihood of excessive wear upon the coil springs 26 due to engagement with the input 24 during compression of the springs as a result of turning of the input relative to the output 25 and/or vice versa.

The input 24 of the damper 18 is affixed to the piston 19 of the bypass clutch 17 at points established by a circular array of rivets 30. The shanks of such rivets extend through openings 36b which are provided in the arms 36 of the input 24 radially outwardly of the coil springs 26. The output 25 has an internal gear 31 mating with an external gear (spur gear) on the extension 15a of the hub 15. These mating internal and external gears preferably mesh with a certain play to ensure that the output 25 is mounted on the axial extension 15a with a certain angular play. In other words, the mating gears of the output 25 and extension 15a ensure that the damper 18 becomes effective with a certain delay.

The extent of angular movability of the input 24 and output 25 of the damper 18 is determined by the rivets 32 (FIG. 1) each of which is rigidly affixed to the input 24 and each of which extends into an arcuate circumferentially extending slot 33 of the output 25. The lengths of the slots 33 (as seen circumferentially of the radially inner portions of the input 24 and output 25) determine the extent to which the input and the input can turn relative to each other about the axis X—X of the housing 13.

The slots 33 and the rivets 32 can be omitted if the torsional vibration damper 18 is set up to limit the extent of angular movability of the input 24 and output 25 relative to each other solely under the action of coil springs 36. Thus, the angular movability of the input 24 and output 25 relative to each other from their neutral positions can be terminated when the convolutions of at least one of the coil springs 26 come into actual abutment with each other, i.e., when the at least one coil spring 26 begins to act as a solid block. In such instance, the convolutions 26a of the coil springs 26 can be provided with jackets or coats of a suitable elastomeric material.

FIG. 1 further shows a safety ring 34 which is disposed between the left-hand heads of the rivets 32 and the adjacent side of the output 25; the purpose of the safety ring 34 (the illustrated safety ring is a flat annular disc resembling a washer) is to prevent penetration of the left-hand heads of the rivets 32 into the respective arcuate slots 33 of the output 25.

The input 24 and the output 25 of the damper 18 are urged apart in the axial direction of the housing 13 by additional resilient means 35 shown in FIG. 1 in the form of a membrane- or diaphragm (Belleville) spring which urges the output against the safety ring 34. This resilient means 35 opposes angular movements of the input 24 and output 25 relative to each other while the parts 24, 25 move in directions to stress the coil springs 26 as well as while the springs 26 are permitted to dissipate some energy.

The illustrated torsional vibration damper 18 can be utilized with advantage in many types of torque converters, i.e., not only in those shown in the drawing and described in the specification of the present application. Furthermore, the torque converter 1 can employ several torsional vibration dampers, for example, the damper 18 and a second damper between the turbine 14 and the hub 15.

The rivets 30 connect the piston 19 of the bypass clutch 17 with the arms 36 radially outwardly of the plate-like central portion or body 24a of the input 24. The arms 36 can be pivoted relative to the body 24a, i.e., the rivets 30 can move (within limits) relative to the body 24a in the axial direction of the housing 13. FIG. 2 shows that the surfaces bounding each recess 27 can be disposed at least substantially at right angles to each other. Each arm 36 of the input 24 shown in FIG. 2 has a trapezoidal shape and tapers radially inwardly toward the center of the input body 24a. This ensures that the rigidity of each arm 36 decreases radially inwardly toward the junction with the body 24a. In other words, the flexibility of each arm 36 decreases in a direction toward the axis X—X. Such arrangement is desirable because it reduces the likelihood of breakage of the arms in the regions of the rivets 30, especially due to fatigue in response to axial and/or other stressing during repeated engagement and disengagement of the bypass clutch 17 as well as while the bypass clutch is at least partly engaged. Still further, such configurations of the arms 36 exert a positive influence upon the piston 19 of the bypass clutch 17, especially in the regions of the rivets 30.

It is also within the purview of the present invention to provide the arms 36 with slots extending from the respective openings 36b toward or to the body 24a of the input 24 to thus enhance the elasticity of the input. Analogously, the piston 19 can be provided with slots extending radially outwardly to the rivets 30 to thus enhance its elasticity and to prolong its useful life. The provision of locating projections 36a which constitute bent portions of the arms 36 also contributes to flexibility of the respective (radially inner or inner-most) portions of such arms.

The piston 19 need not be directly connected with the input 24; for example, the bypass clutch 17 or an equivalent thereof can comprise a washer or an analogous part which is rigid with the input and is connected to the piston 19 with limited freedom of axial movement, e.g., due to elasticity of the piston and/or washer.

Furthermore, the torque converter 1 can comprise two or even more dampers, e.g., the damper 18 and a second damper between the turbine 14 and the hub 15 of the torque converter. The arrangement is or can be such that, when the bypass clutch 17 is engaged, torque can be transmitted directly from the housing 13 to the hub 15 so that the pump 12 and the turbine 14 are bypassed. On the other hand, when the bypass clutch 17 is disengaged, torque is transmitted from the housing 13, through the pump 12, body of hydraulic fluid in the housing 13 and turbine 14 on to the hub 15. The transmission of torque from the housing 13 to the hub 15 can take place along two paths if the bypass clutch is only partly engaged, i.e., when the piston 19 frictionally engages but is free to slide relative to the shell 4 of the housing 13. An advantage of the torque converter 1 is that a single torsional vibration damper 18 suffices to damp vibrations of torque regardless of whether such torque is being transmitted only via pump 12, only via bypass clutch 17, or along each such path.

The ring 29 exhibits the advantage that it renders it possible to achieve substantial savings in space in the axial and radial directions of the torque converter 1. This will be readily appreciated by taking into consideration that the ring 29 occupies space (within the coil springs 26) which would otherwise remain unoccupied. Moreover, the ring 29 does not interfere with confinement of springs 26 in discrete recesses 27 between the radially outwardly extending arms 36 of the input 24. The properly installed ring 29 can be held against undesirable stray movements in any desired direction such as radially outwardly, radially inwardly and/or axially of the input 24. The locating projections 36a constitute but one of several means which can be utilized to prevent stray movements of the ring 29. The provision of projections 36a and of their slits 36c exhibits the advantage that they contribute to axial flexibility or yieldability of the input 24 (i.e., more than separately produced projections which are welded to the input 24 radially inwardly of the ring; such separately produced projections would actually increase the rigidity of the input 24).

The arms 36 are or can be configured to ensure that they can cooperate with the portions 28a of the output 25 to properly engage and stress commercially available coil springs. Thus, the confronting edge faces of neighboring arms 36 are or can be parallel to each other.

It is within the purview of the present invention to provide the projections 7 on the disc 6 and to provide the openings 6b in the mass 8 or in another part of or borne by the housing 13. The same holds true for the interchangeability of positions of the snap fastener 9d and the opening or openings 6c. Such snap fastener permits, if and when necessary, for convenient detachment of the torque converter 1 from the shaft 2. It is also possible to employ snap fasteners in the form of splints which can enter openings in the projections 7 by snap action and/or otherwise.

Figure 6:
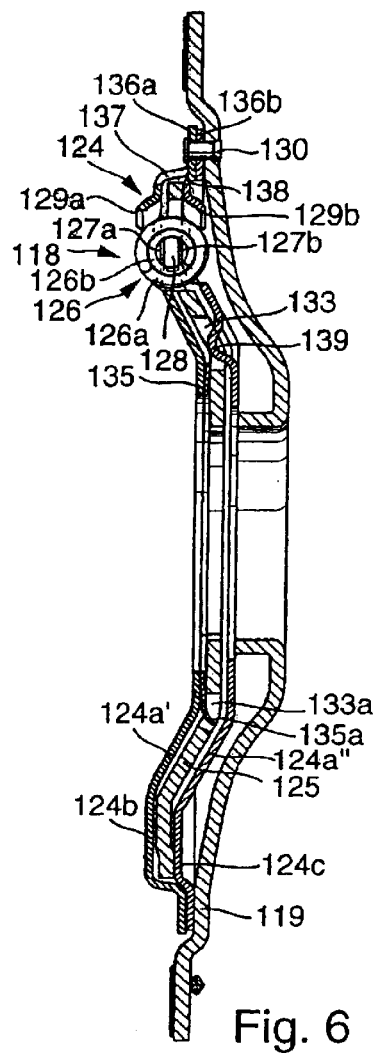
FIG. 6 is a substantially axial sectional view as seen in the direction of arrows from the line VI—VI in FIG. 7 and shows a modified torsional vibration damper which can be utilized in the hydraulic torque converter of the present invention.
Figure 7:
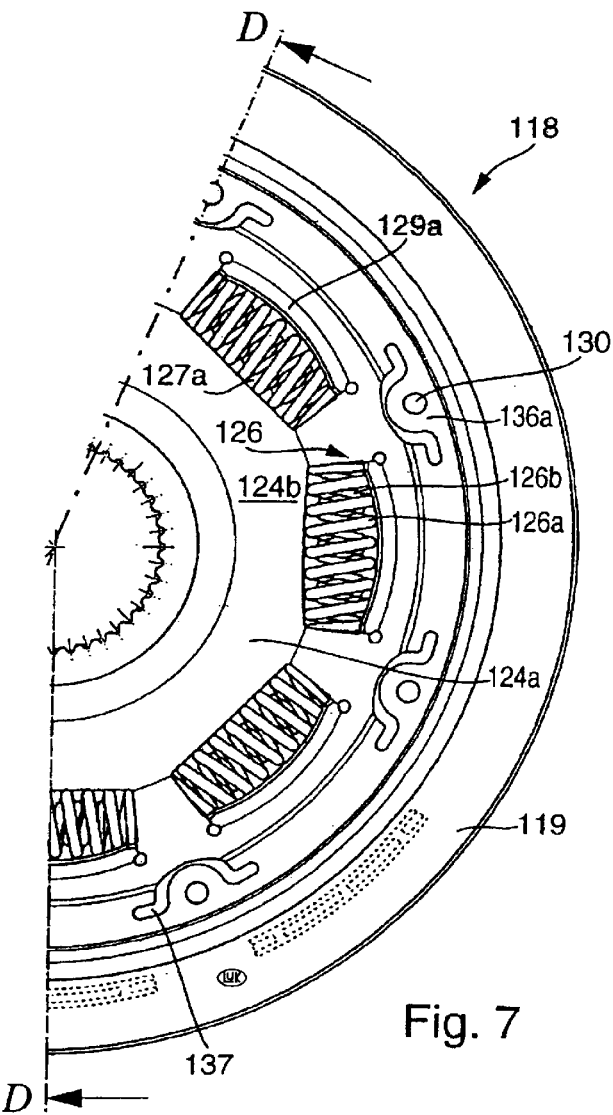
FIG. 7 is a fragmentary elevational view of the input and of the energy storing means in the damper, as seen from the left-hand side of FIG. 6, and further shows the means for fastening the damper to the piston of the bypass clutch forming part of a torque converter embodying the damper shown in FIG. 6.

FIGS. 6 and 7 illustrate the torsional vibration damper 118 and the piston 119 of a modified torque converter. The piston 119 is secured to the input 124 of the damper 118 by an annular array of rivets 130. The input 124 comprises two walls 124b, 124c which flank the output 125 of the damper 118 and the marginal portion of each of which is secured to the piston 119 by the rivets 130. Such rivets are located radially outwardly of the friction surface 119a of the piston 119.

The marginal portions of the walls 124b, 124c of the input 124 are not profiled, i.e., they are not provided with radial extensions corresponding to the arms 36 of the input 24. However, and in order to ensure adequate elasticity (axial flexibility) of such walls, their plate-like central bodies 124a', 124a'' are partially separated from the rivet-receiving marginal portions 136a by suitably configurated stiffness-reducing windows or slits 137 and 138, respectively. Additional cutouts or slits can be provided to enhance the flexibility of certain other portions of the plate-like body 124a' and/or 124a''. Each of the illustrated stiffness-reducing slits 137, 138 is substantially U-shaped and partially surrounds the respective rivet 130. The central portions of the slits 137, 138 are narrower than their end portions, and such end portions are or can be located at the same radial distance from the axis of the damper 118 as the rivets 130.

The walls 124b, 124c of the composite input 124 (as well as the plate-like body or wall 24a of the input 24 of the damper 18) are preferably made by resorting to a deep drawing, stamping of pressing (molding) technique. It is often advisable to provide the slits 137, 138 in the blanks which are to be converted into the walls 124b, 124c prior to the final shaping procedure, i.e., prior to imparting to these walls configurations (curvatures) corresponding to those shown in FIG. 6, e.g., by resorting to a potting or an analogous technique. This simplifies the formation of slits 137, 138 because these slits can be formed in the blanks for the walls 124b, 124c while the blanks are still flat.

Figure 8:
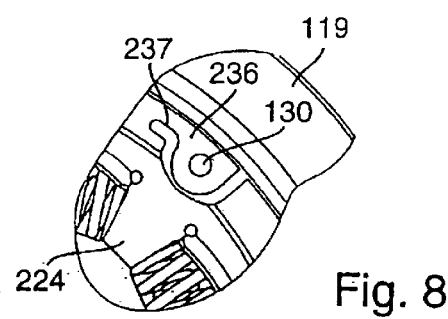
FIG. 8 is a view similar to that of FIG. 7 but shows a portion of a modified input.

FIG. 7 shows that the slits 137 are closed at their ends, i.e., that they do not extend all the way to the peripheral surface of the wall 124b. The same applies for the windows or slits 138 in the wall 124c. On the other hand, FIG. 8 illustrates a modification wherein one end portion of the slit or recess or window 137 is open, i.e., such open end portion extends radially outwardly beyond the rivet 130 and all the way into the peripheral surface of the illustrated input wall 224b. This results in the making of a tongue 236 which extends circumferentially of the wall 224b and is secured to the piston 119 of the associated bypass clutch by the illustrated rivet 130. An advantage of the structure which is shown in FIG. 8 is that the wall 224b and the tongue 236 are movable relative to each other axially (i.e., at right angles to the plane of FIG. 8) and that the tongue 236 can also have a certain freedom of radial movement relative to the common axis of the wall 224b and piston 119.

Referring again to FIGS. 6 and 7, the composite input 124a+124b and the output 125 of the damper 118 can turn relative to each other about their common axis under the bias or against the opposition of energy storing means including an annular assembly of coil springs 126. Each coil spring 126 is a composite coil spring in that it includes an outer spring 126a and an inner spring 126b confined in the respective outer spring. The springs 126a are received in windows 127a, 127b of the walls 124b, 124c and in windows 128 provided in the output 125. When the input 124a, 124b and the output 125 are caused to turn relative to each other, the radially extending surfaces flanking the windows 127a, 127b, 128 bear upon the end convolutions of and stress the respective composite coil springs 126.

The reference characters 129a, 129b denote flaps or extensions respectively provided on the walls 124b, 124c of the composite input to limit the extent of movability of the composite coil springs 126 radially outwardly, e.g., under the action of centrifugal force. The shapes of the radially inwardly facing surfaces of the flaps 129a, 129b preferably conform or substantially conform to the adjacent portions of external surfaces of convolutions forming part of the larger-diameter coil springs 126a.

The extent of angular movability of the input 124b, 124c and the output 125 of the damper 118 relative to each other is determined by a projection 139 constituting a substantially axially depressed portion of the wall 124c and received in a recess 133 of the output 125. The length of the recess 133 (as seen in the circumferential direction of the damper 118) determines the extent of angular movability of the input 124b, 124c and output 125 relative to each other; this recess is longer than the projection 139 (again as seen in the circumferential direction of the damper).

The damper 118 can be provided with two or more circumferentially spaced apart projections 139 and with an equal nuber of recesses 133, one for each projection 139. Furthermore, similar or analogous means for limiting the angular movements of the input and output of the torsional vibration damper relative to each other can be employed in the torque converter 1 of FIGS. 1 to 5 as well as in other torque converters which are described and shown in the specification and drawing of the present application. Still further, similar means for limiting angular movements of two or more parts which are turnable relative to each other about a common axis and whose turnability must be limited with a high degree of accuracy and reliability can be employed in conventional torque converters or in numerous other apparatus.

The projection 139 of the wall 124c can be replaced with a part (such as a tongue or pin or the like) which is a separately produced element and is welded or otherwise affixed to the wall 124c.

FIG. 6 further shows a resilient energy storing element or device 135 which is a diaphragm spring or a membrane and serves to bias the wall 124b axially and away from the output 125, i.e., away from the wall 124c. The means for ensuring that the diaphragm spring 135 shares the angular movements of one of the input 124b, 124c and output 125 relative to the other of these components of the damper 118 comprises a tongue 135a provided on the diaphragm spring 135 and extending into one of the recesses 133 or into a discrete recess or window 133a of the output 125. Thus, the diaphragm spring 135 is compelled to share all angular movements of the output 125 relative to the input 124b, 124c.

The diaphragm spring 135 further serves as a means for yieldably opposing turning of the input 124b, 124c and output 125 relative to each other. If the damper 118 is to permit a certain amount of angular movement of the input 124b, 124c and output 125 relative to each other, the opening 133a is dimensioned to receive the tongue 135a of the diaphragm spring 135 with a preselected amount of play in the circumferential direction of the damper 118. Such arrangement ensures that the friction between the diaphragm spring 135 and the input 124b, 124c and/or output 125 becomes effective with a preselected delay following initial angular displacement of the input and output relative to each other. Such delayed friction can be resorted to in the damper 118 as well as in the damper 18 and in other dampers which can be utilized in torque converters embodying the present invention.

The slots 137 and/or 237 can be formed in the blanks which are thereupon converted into the input wall 124b or 224b by resorting to a stamping procedure. However, it is also possible to provide such slots in a partly finished (shaped) wall 124b or 224b. Still further, it is possible to provide the blanks which are to be converted into the walls 124b and/or 224b with simple slits and to thereupon deform (such as selectively widen) these slits during certain stages of conversion (shaping) of blanks into finished walls 124b and/or 224b. This can be readily achieved by providing the slits in those portions of a blank for the wall 124b or 224b which are thereupon flexed, upset and/or otherwise curved as can be seen, for example, in the region of the slot 137 in the upper portion of FIG. 6.

Figure 9:
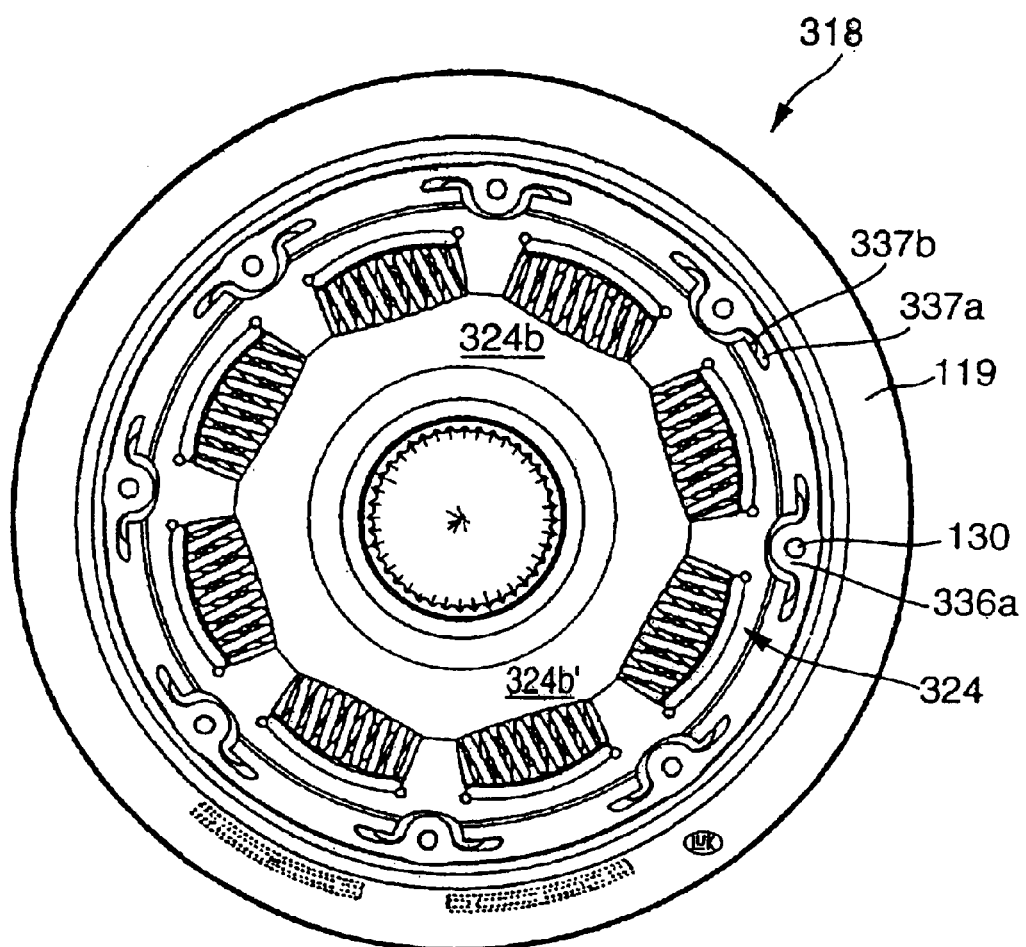
FIG. 9 is a view similar to that illustrated in FIG. 7 but showing certain constituents of an additional torsional vibration damper and of the means for affixing it to the piston of the bypass clutch.

FIG. 9 shows a damper 318 which is similar to the damper 118 of FIGS. 6 and 7. The wall 324b of the input 324 of the damper 318 is non-rotatably affixed to the piston 119 of a bypass clutch by rivets 130 occupying an annular array of points or locations as seen in the circumferential direction of the radially outermost (marginal) portion of the piston. The wall 324b of the input 324 is provided with slots or windows 337a which are not identical with the slots or windows 337b provided in the other wall (not shown in FIG. 9) of such composite input. The other wall of the input 324 is located behind the wall 324b. The reason for differences between the slots 327a and 327b is that, under certain circumstances, axial flexibility of one wall of the input should deviate from that of the other wall, especially if the two walls are not identical. It has been found that the flexibility of the walls forming part of an input should depend or preferably depends upon their dimensions and/or other parameters.

In FIG. 9, the slots 337a are longer (as seen circumferentially of the piston 119) than the slots 337b. In other words, axial flexibility of the flaps 336a forming part of the wall 324b exceeds that of the flaps on the other wall of the input 324.

Figure 10:
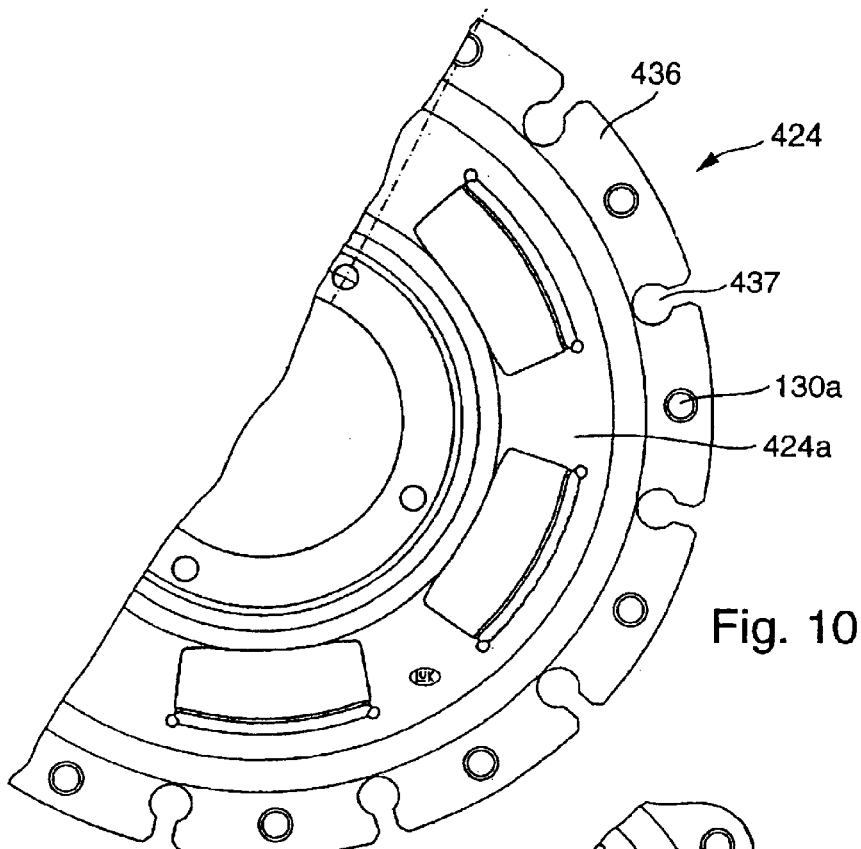
FIG. 10 is a fragmentary elevational view of the input in an additional torsional vibration damper and of an array of fasteners which secure the input to the piston of a bypass clutch, e.g., a clutch of the type shown in FIG. 1.

FIG. 10 illustrates a portion of an input 424 forming part of a damper resembling the damper 118 of FIGS. 6 and 7. In order to enhance axial flexibility in the regions between the central portion of the disc or wall 424a and the radial arms 436 which are flanked by the slots 437, the radially outer ends of these slots are open, i.e., they extend all the way to the peripheral surface of the disc 424a. In addition, each slot 437a extends substantially exactly radially inwardly and has an enlarged radially innermost portion bounded by a circular surface. The openings 130a are provided in the arms 436 and serve to receive rivets (not shown) which secure the disc 424a to the other disc or wall (not shown) of the input 424. The openings 130a are or can be provided midway or substantially midway between the neighboring keyhole-shaped slots 437.

An advantage of the input 424 of FIG. 10 is that it permits often desirable and necessary wobbling vibratory movements of the disc 424a relative to the output (not shown) of the damper in the torque converter embodying the structure of FIG. 10. Thus, neighboring arms 436 of the wall 424a have a limited freedom of movement in a direction at right angles to the plane of FIG. 10. This reduces the likelihood of development of excessive stresses in the torque converter embodying the structure of FIG. 10. Excessive stresses could cause cracking of the disc or wall 424a in the regions of the openings 130a.

An advantage of keyhole-shaped recesses or slots 437 is that one avoids the formation of pronounced severed or stamped edges. Moreover, the likelihood of fatigue in regions where the arms 436 are repeatedly flexed relative to the central portion or wall 424a of the input 424 is remote, and the same holds true as concerns the development of cracks at the radially inner ends of the keyhole-shaped recesses 437. Similar results can be obtained if the sharply defined corners 36f of the recesses 36 shown in FIG. 2 are replaced with much less or at least somewhat less pronounced corners bounded by concave edge faces of the central portion 24a and the arms 36 of the input 24.

Figure 11:
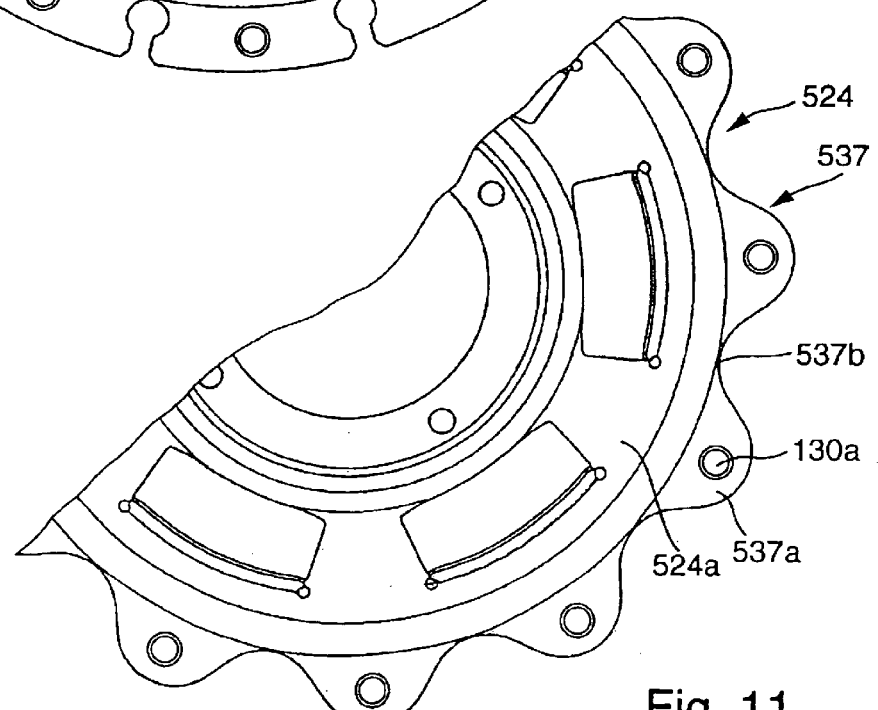
FIG. 11 is a fragmentary elevational view of an input forming part of still another torsional vibration damper and constituting a modification of the input shown in FIG. 10.

FIG. 11 illustrates a portion of an input 524 having a disc or wall 524a with an undulate peripheral surface bounding an annular array of recesses 537 the length of each of which decreases gradually toward the axis of the damper including the input 524. The arms 537a alternate with the recesses 537 and each such arm has an opening 130a for a rivet (not shown in FIG. 11) which secures the disc or wall 524a to the other disc or wall (not shown) of the input 524. The radially innermost portions 537b of the recesses 537 are bounded by concave portions of the peripheral surface of the wall 524a.

An advantage of the input 524 is that the lengths of the recesses 537 (as measured in the circumferential direction of the input) can equal or even exceed the lengths of the arms 537a. This even further reduces the likelihood of premature cracking of and/or other damage to the input 524 in response to repeated axial flexing of the arms 537a and the central portion 524a relative to each other.

An advantage of arms of the type shown at 36 in FIG. 2 over arms 537a is that the radially outwardly extending edge faces of the arms 36 can lie flush against the adjacent end convolutions 26a of the coil springs 26. Regardless of their exact shapes, the arms of all inputs can be slotted and/or otherwise influenced to increase their flexibility in the axial direction of the respective torsional vibration damper.

Figure 12:
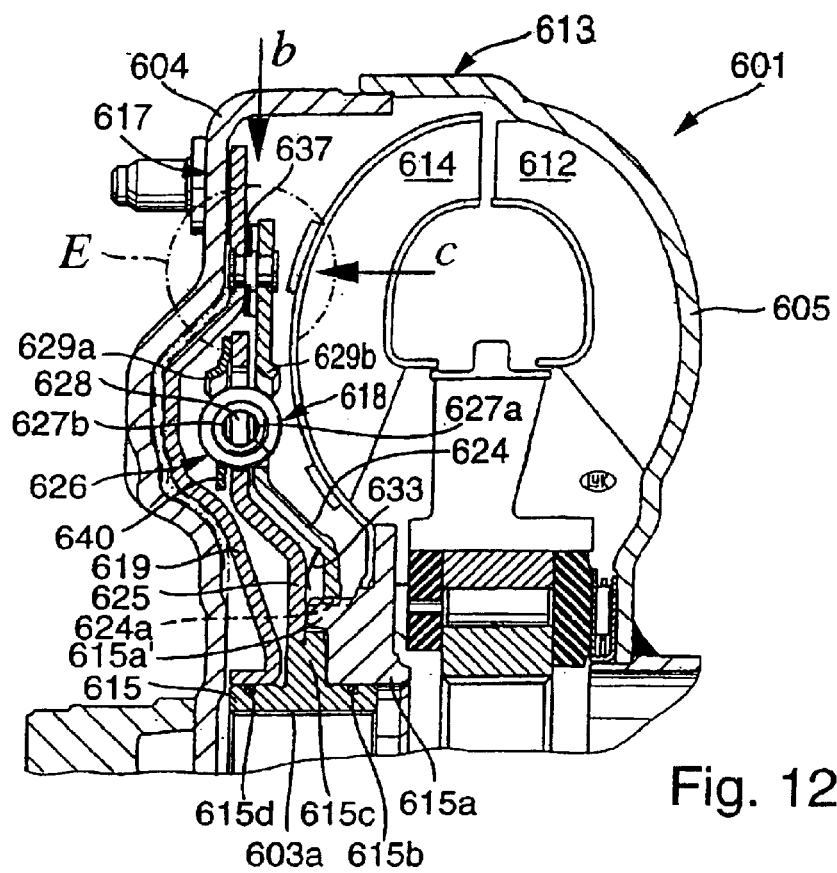
FIG. 12 is a fragmentary axial sectional view of a hydraulic torque converter constituting a further modification of the torque converter shown in FIG. 1 including a different non-rotatable but axially yieldable connection between the piston of the bypass clutch and the input of the torsional vibration damper.
Figure 13:
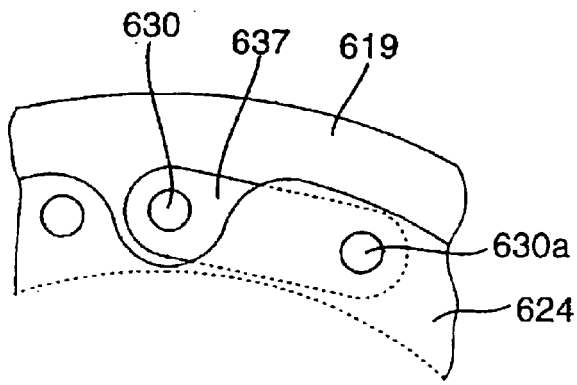
FIG. 13 is an enlarged view of a detail as seen in the direction of arrow XIII which is shown in FIG. 12.
Figure 14:
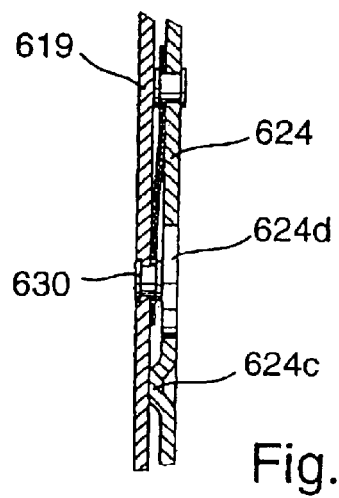
FIG. 14 is an enlarged view of a detail as seen in the direction of arrow XIV which is shown in FIG. 12.

FIGS. 12 to 14 illustrate certain features of a further hydraulic torque converter 601 having a housing 613 composed of two partially interfitted shells or walls 604 and 605. A pump or impeller 612 is installed in and rotates with the shell 605; this pump can circulate a body of hydraulic fluid which, in turn, can rotate a turbine 614 extending in part into the interior of the shell 604. The latter is connected to the output shaft 602 of the prime mover in the power train of a motor vehicle, e.g., without the interposition of a disc corresponding to the disc 2 in the torque converter 1 of FIG. 1. The housing 613 constitutes the input of the torque converter 601.

The output element of the torque converter 601 is constituted by or includes a hub 615 having an internal gear 603a mating with an external gear on the input shaft of the change-speed transmission (not shown in FIGS. 12 to 14). The torque converter 601 further comprises a bypass clutch 617 which, when engaged, transmits torque directly between the housing 613 and the hub 615. When the clutch 617 is disengaged, the transmission of torque takes place from the housing 613 to the hub 615 by way of a torsional vibration damper 618; this mode of operation departs from that of the torque converter 1 shown in FIG. 1.

In order to connect the damper 618 to the turbine 614, the latter is rotatably mounted on the hub 615 and, to this end, the turbine carries a discrete hub 615a which is nonrotatably connected with the turbine. The hub 615a is rotatable on the hub 615 and is sealingly secured thereto by a sealing ring 615b. A radially extending collar 615c constitutes an axial stop for the hub 615a and its radially outermost portion non-rotatably carries the output 625 of the torsional vibration damper 618. That side of the stop 615c which faces away from the hub 615a for the turbine 614 is surrounded by a sleeve constituting the radially outermost portion of the piston 619 which forms part of the bypass clutch 617. The sleeve of the piston 617 is rotatable on and is movable axially of the hub 615 and surrounds a sealing ring 615d which is recessed in this hub.

The input 624 of the damper 618 has an internal gear 624a which mates with a complementary (spur) gear on an axial projection 615a' of the discrete hub 615a for the turbine 614. The energy storing means 626 of the damper 618 opposes rotation of the input 624 and output 625 relative to each other, and the input 624 is axially movably connected with the piston 614 of the bypass clutch 617. It will be noted that the axial projection 615a' is located radially outwardly of the collar 615c for the output 625. In accordance with a feature of the invention embodied in the torque converter 601, the axial rigidity of the input 624 of the damper 618 is pronounced, i.e., an axially yieldable input is replaced with the axially rigid or stiff input 624 and the torque converter 601 further comprises discrete resilient means 637 installed between the input 624 and the piston 619.

FIG. 13 shows one of the resilient means 637; it constitutes a leaf spring which is riveted to the piston at 630 and to the input 624 at 630a. This leaf spring 630 is but one of an annular array or assembly of such leaf springs which permit limited axial movements of the piston 619 relative to the axially rigid input 624. Discrete rivets 630 and/or 630a can be replaced with rivet-shaped formations (displaced portions) of the input 624 and/or piston 619. The heads of such formations resemble and act as rivet heads; they are anchored in the end portions of the leaf springs 637.

FIG. 14 shows that the torque converter 601 further comprises at least one axial stop 624c which serves to maintain the piston 619 at a selected axial distance from the input 624 of the damper 618; the illustrated stop 624c of FIG. 14 is an integral part of the input 624. It is normally preferred to employ an annular arrangement of several discrete axial stops 624a. The character 624d denotes in FIG. 14 a window which is provided in the input 624 and affords access to the rivet 613. The input 624 is provided with several windows 624d, one for each of the rivets 630.

Referring again to FIG. 12, the output 625 of the damper 618 separates the input 624 from a washer 640. The radially outer portions of the input 624 and the washer 640 are welded and/or riveted to each other between neighboring springs 626 or radially outwardly of such springs. Each spring 626 is a composite resilient element including an outer coil spring and an inner coil spring which is confined in the outer coil spring. Each such composite coil spring 626 is received in part in one of the windows 627a provided in the input 624, in one of the windows 627b provided in the output 625, and in one of the windows 628 provided in the washer 640. Such mounting compels the springs 626 to store energy when the input 624 and the washer 640 are caused to turn relative to the output 625 and/or vice versa.

Friction generating devices 633 anchored in the input 624 and bearing upon the output 625 generate friction when the parts 624, 625 are caused to turn relative to each other. Each device 633 (only one shown in FIG. 12) is or can constitute a leaf spring which is installed to bias the output 625 axially and away from the input 624 and/or vice versa.

The packages 626 of coil springs are held against excessive movement radially outwardly (e.g., under the action of centrifugal force) by abutments 629a and 629b respectively provided on the washer 640 or output 625 and input 624. Each abutment 629b is shown as an integral part of the input 624. On the other hand, each abutment 629a is or can constitute a separately produced part which is affixed to the output 625 or to the washer 640.

The rivets 630 and/or 630a can be replaced with screws, bolts and nuts and/or other types of fasteners without departing from the spirit of our invention. The utilization of rivets which are of one piece with the piston 619 or with the input 624 is preferred in many instances because this entails a substantial reduction of the overall number of parts in the torque converter 601.

The leaf springs 637 can be installed radially inwardly of the springs 626 or at the same radial distance from the axis X—X; in the latter case, the leaf springs 637 can alternate with the springs 636 as seen in the circumferential direction of the damper 618.

It is also possible to install the damper 618 axially between the housing 613 and the piston 619 or axially between the piston and the turbine 614 (this is actually shown in FIG. 12).

The springs of the damper can constitute expansion or compression springs.

Figure 15:
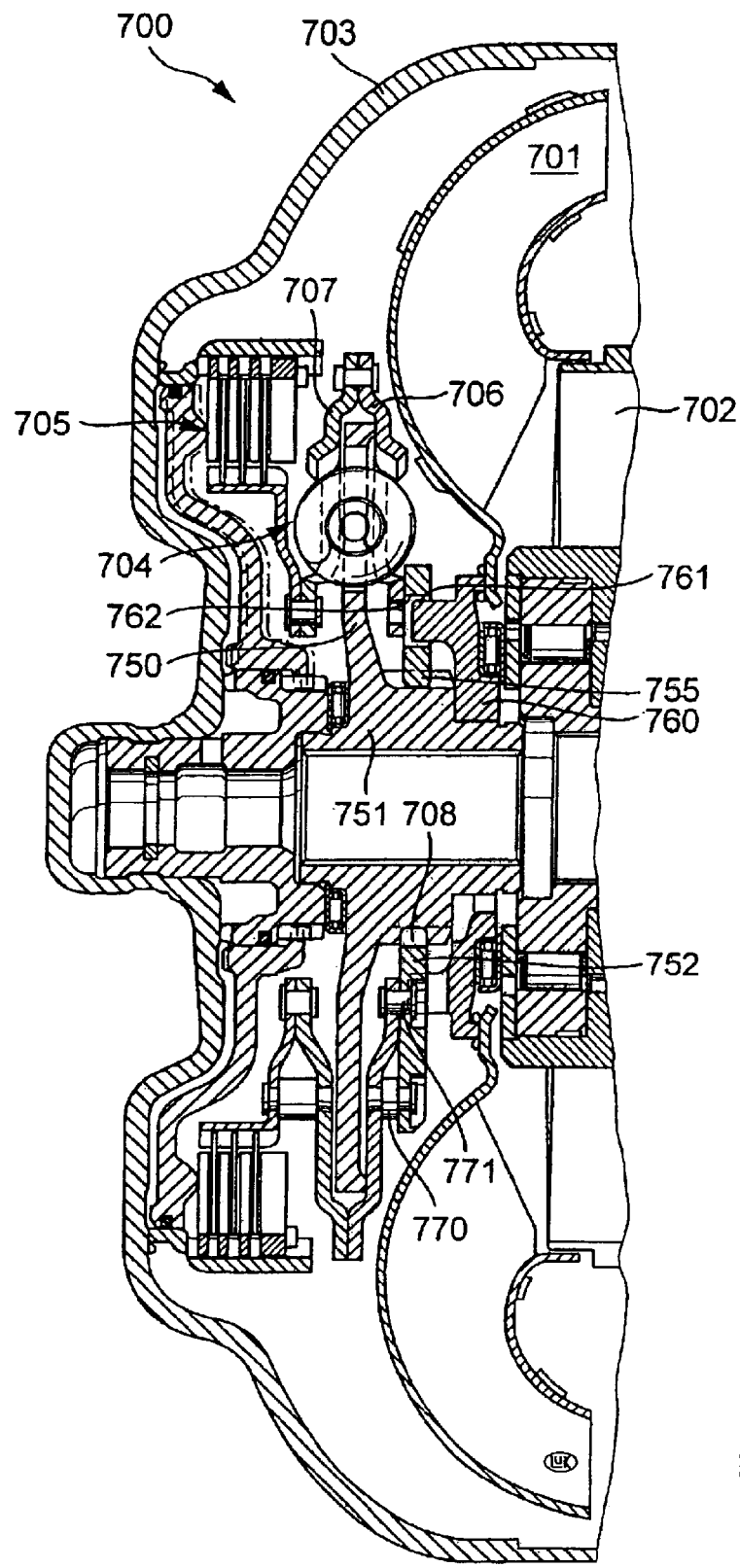
FIG. 15 is a fragmentary axial sectional view of a hydraulic torque converter constituting a further modification of the torque converter which is illustrated in FIG. 1, and more specifically of a different connection between the bypass clutch and the torsional vibration damper.

FIG. 15 shows a further improved hydraulic torque converter 700 which includes an impeller or pump (not visible in that portion of the torque converter which is shown in FIG. 15), a turbine 701 in a housing 703, and a stator 702 between the pump and the turbine. A torsional vibration damper 704 and a bypass clutch 705 are also provided in the housing 703. The damper 704 comprises essentially an input composed of two disc-shaped members or walls 706, 707 having radially outermost portions which are riveted or otherwise affixed to each other and are provided with windows for energy storing elements. A flange-like output 750 of the damper 704 is disposed between the disc-shaped members 706, 707 of the input and its radially innermost portion is of one piece with an output element or hub 751; however, it is equally possible to employ separately produced parts 750, 751 which are welded or otherwise reliably affixed to each other.

The member 706 of the input of the damper 704 is installed between the turbine 701 and the output 750 and is connected with (such as riveted to) an adapter 752 having an internal gear 708 mating with a spur gear 755 of the hub 751 with a certain play at least matching the maximum required angular movability of the input 706, 707 and output 750 of the damper 704 relative to each other.

A hub 760 is connected with a casing 701a of the turbine 701, e.g., by welding, by rivets or by resorting to a friction fit. That side of the hub 760 which confronts the damper 704 is provided with axially parallel extensions 761 (e.g., with an annular arrangement of equidistant extensions) which are received in complementary recesses 762 of the adapter 752, preferably at least substantially without play. The adapter 752 serves to connect the turbine 701 with the disc or wall 706 of the input of the damper 704, i.e., the latter is mounted to damp vibrations of the turbine as well as vibrations of the bypass clutch 705. It is to be noted that the turbine hub 760 is turnable relative to the hub 751.

The adapter 752 is connected to the part 706 of the input of the damper 704 by two annuli of rivets. The outer annulus includes rivets 770, and the inner annulus includes rivets 771. The arrangement can be such that the rivets 770 are offset relative to the rivets 771 in the circumferential direction of the adapter 752; this reduces the tensional stresses between the adapter and the input 706, 707 of the damper 704.

An advantage of the adapter 752 is that it can be utilized to connect any one of several types of dampers with any one of several types of turbines, i.e., it is possible to select (for use in the torque converter 700 or in another torque converter) any one of several types of torsional vibration dampers and any one of several types of turbines by resorting to the building block construction principle of FIG. 15.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of torque converters and, therefore, such adaptations should and are intended to be comprehended within the meaning and range of equivalence of the appended claims.

What is claimed is:

1. A hydraulic torque converter, comprising: a housing arranged to rotate about a predetermined axis, to confine a supply of hydraulic fluid and to receive torque from an output element of a prime mover; a pump disposed in and arranged to rotate with said housing about said axis; an annular turbine coaxial with said pump, disposed in said housing and arranged to receive torque from the fluid in said housing in response to rotation of said pump; a rotary input element coaxial with said housing; a rotary output member arranged to transmit torque between said input element and at least one of said pump, said turbine and said housing; a bypass clutch engageable to transmit force between said pump and said turbine during predetermined stages of operation of the torque converter; and at least one torsional vibration damper in a power flow between said housing and said output member, including an input, an adapter fixedly connected to said input, an output coaxial with said housing and said input and rotatable relative to said input, an output hub firmly affixed to said output, and energy storing means arranged to oppose rotation of said input and said output relative to each other; wherein the turbine comprises a turbine hub fixedly connected to the turbine and rotatably supported on said output hub, said turbine hub carrying axially directed extensions arranged at equal angular intervals on a circle concentric to said axis; and wherein the adapter comprises recesses arranged and configured to receive said axially directed extensions and the adapter has a thickness that is greater than a thickness of the input of the damper.

2. The torque converter of claim 1, wherein said adapter is connected to said input of said damper by a first set of fasteners and a second set of fasteners that are radially offset from said first set of rivets.

3. The torque converter of claim 2, wherein each of said first and second set of fasteners comprises a plurality of rivets.

4. The torque converter of claim 1, wherein said output comprises a flange that is integrally a part of said output hub at its radially innermost portion.

* * * * *